United States Patent
Maurizio (10) Patent No.: US 9,816,382 B2
(45) Date of Patent: *Nov. 14, 2017

(54) TURBOMACHINE BLADE AND RELATIVE PRODUCTION METHOD

(71) Applicant: Pietro Rosa T.B.M. S.r.l., Maniago (IT)

(72) Inventor: Andrea Maurizio, Cavasso Nuovo (IT)

(73) Assignee: Pietro Rosa T.B.M. S.r.l., Maniago (IT)

( * ) Notice: Subject to any disclaimer, the term of this patent is extended or adjusted under 35 U.S.C. 154(b) by 616 days.

This patent is subject to a terminal disclaimer.

(21) Appl. No.: 14/194,333

(22) Filed: Feb. 28, 2014

(65) Prior Publication Data

US 2014/0241891 A1 Aug. 28, 2014

(30) Foreign Application Priority Data

Feb. 28, 2013 (IT) ............... TV2013A0029

(51) Int. Cl.
*F01D 5/14* (2006.01)
*F01D 5/30* (2006.01)
*B23P 15/04* (2006.01)

(52) U.S. Cl.
CPC ............ *F01D 5/30* (2013.01); *B23P 15/04* (2013.01); *F01D 5/14* (2013.01); *F01D 5/141* (2013.01); *F05D 2230/10* (2013.01); *F05D 2230/232* (2013.01); *F05D 2230/25* (2013.01); *F05D 2230/54* (2013.01); *F05D 2230/61* (2013.01); *Y02T 50/673* (2013.01); *Y10T 29/49337* (2015.01)

(58) Field of Classification Search
CPC ............ F01D 5/225; F01D 5/147; F01D 5/14; F01D 5/141; F01D 5/30; F05D 2230/232; B23P 15/04; Y10T 29/49337

USPC .............. 416/191, 214 R, 232; 228/112.1
See application file for complete search history.

(56) References Cited

U.S. PATENT DOCUMENTS

| | | | |
|---|---|---|---|
| 2,675,208 | A | 4/1954 | Weinberg |
| 3,044,746 | A | 7/1962 | Stargardter |
| 4,012,616 | A | 3/1977 | Zelahy |
| 5,269,058 | A | 12/1993 | Wiggs et al. |
| 6,616,408 | B1 | 9/2003 | Meier |
| 7,189,064 | B2 | 3/2007 | Helder et al. |
| 8,267,663 | B2 | 9/2012 | Larose et al. |
| 2006/0039792 | A1 | 2/2006 | Ferte et al. |

(Continued)

FOREIGN PATENT DOCUMENTS

| | | | |
|---|---|---|---|
| EP | 1 983 160 A2 | 10/2008 | |
| EP | 2 362 066 A2 | 8/2011 | |

(Continued)

*Primary Examiner* — Matthew W Jellett
(74) *Attorney, Agent, or Firm* — Seed Intellectual Property Law Group LLP (57) ABSTRACT

A turbomachine blade having a metal coupling root, and a metal airfoil-shaped oblong member cantilevered from the coupling root; the airfoil-shaped oblong member being divided into: a lower connecting fin cantilevered from and formed in one piece with the coupling root; an upper connecting fin cantilevered from a coupling head towards the coupling root and formed in one piece with the coupling head; and a main plate-like body which is shaped and positioned between the two connecting fins to form an extension of the fins, and is butt-welded to the same connecting fins to form one piece with the fins.

9 Claims, 7 Drawing Sheets

(56) References Cited

U.S. PATENT DOCUMENTS

| | | |
|---|---|---|
| 2009/0277009 A1 | 11/2009 | Kotzbacher et al. |
| 2010/0068550 A1 | 3/2010 | Watson et al. |
| 2010/0116013 A1 | 5/2010 | Brennand |
| 2011/0005075 A1 | 1/2011 | Trewiler et al. |
| 2011/0211965 A1 | 9/2011 | Deal et al. |
| 2012/0205348 A1 | 8/2012 | Romanelli et al. |
| 2012/0224972 A1 | 9/2012 | Stiehler et al. |
| 2013/0319010 A1 | 12/2013 | Hui et al. |

FOREIGN PATENT DOCUMENTS

| | | |
|---|---|---|
| GB | 679931 | 9/1952 |
| GB | 791751 | 3/1958 |

TURBOMACHINE BLADE AND RELATIVE PRODUCTION METHOD

BACKGROUND

Technical Field

The present disclosure relates to a turbomachine blade and related production method.

More specifically, the present disclosure relates to a method of producing a rotor or stator blade for a compressor or front fan of an aircraft turbine engine, to which use the following description refers purely by way of example.

Description of the Related Art

As is known, rotor and stator blades of aircraft turbine engine compressors substantially comprise a coupling root designed to fit and lock rigidly to the compressor center hub or blade mounting disk; and an airfoil-shaped oblong member, which extends from the coupling root, so as to cantilever radially outwards of the hub or blade mounting disk when the coupling root is fixed inside the center hub or blade mounting disk.

Stator blades also have an upper coupling head, which is located at the top end of the airfoil-shaped oblong member, i.e. at the opposite end to the coupling root, and is designed to fit and lock rigidly to the outer blade mounting ring of the compressor.

Having to withstand fairly severe mechanical stress and heat, the lower coupling root, the airfoil-shaped oblong member, and the upper coupling head (if there is one) are usually formed in one piece from a single block of high-strength metal, which is variously machined to shape the blade as required.

Milling a blade from a single block of metal, however, is an extremely painstaking, time-consuming job requiring special numeric-control milling machines capable of machining large workpieces to a high degree of precision. As a result, blades of this sort are extremely expensive to produce.

BRIEF SUMMARY

It is therefore an aim of the present disclosure to provide a method of producing a turbomachine blade which can significantly reduce the cost of manufacturing metal blades for compressors of aircraft turbine engines.

In compliance with the above aims, according to the present disclosure there is provided a turbomachine blade as defined in claim 1 and preferably, though not necessarily, in any one of the claims dependent on claim 1.

According to the present disclosure, there is also provided a method of producing a turbomachine blade, as defined in claim 10 and preferably, though not necessarily, in any one of the claims dependent on claim 10.

BRIEF DESCRIPTION OF THE SEVERAL VIEWS OF THE DRAWINGS

A non-limiting embodiment of the present disclosure will be described by way of example with reference to the attached drawings, in which:

FIGS. 3 to 12 schematically show some steps in the method of producing the FIGS. 1 and 2 turbomachine blade; whereas

DETAILED DESCRIPTION

Figure 1:
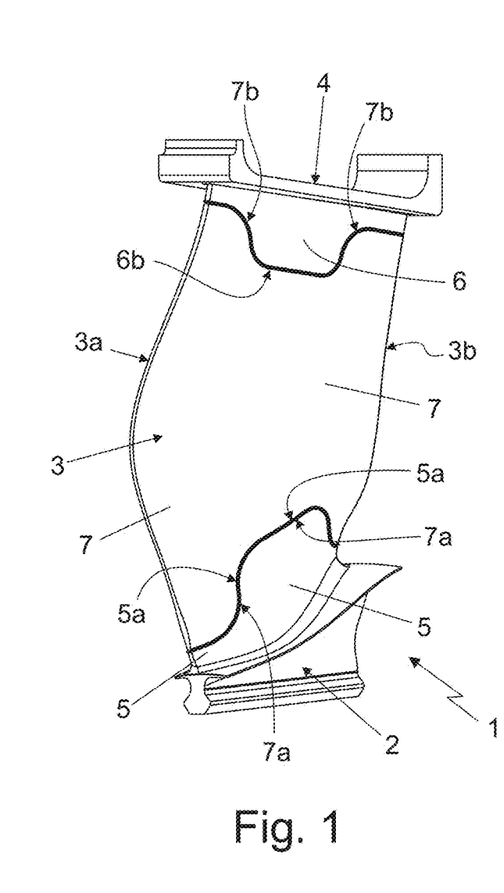
FIG. 1 shows a perspective view of a turbomachine blade in accordance with the teachings of the present disclosure.
Figure 2:
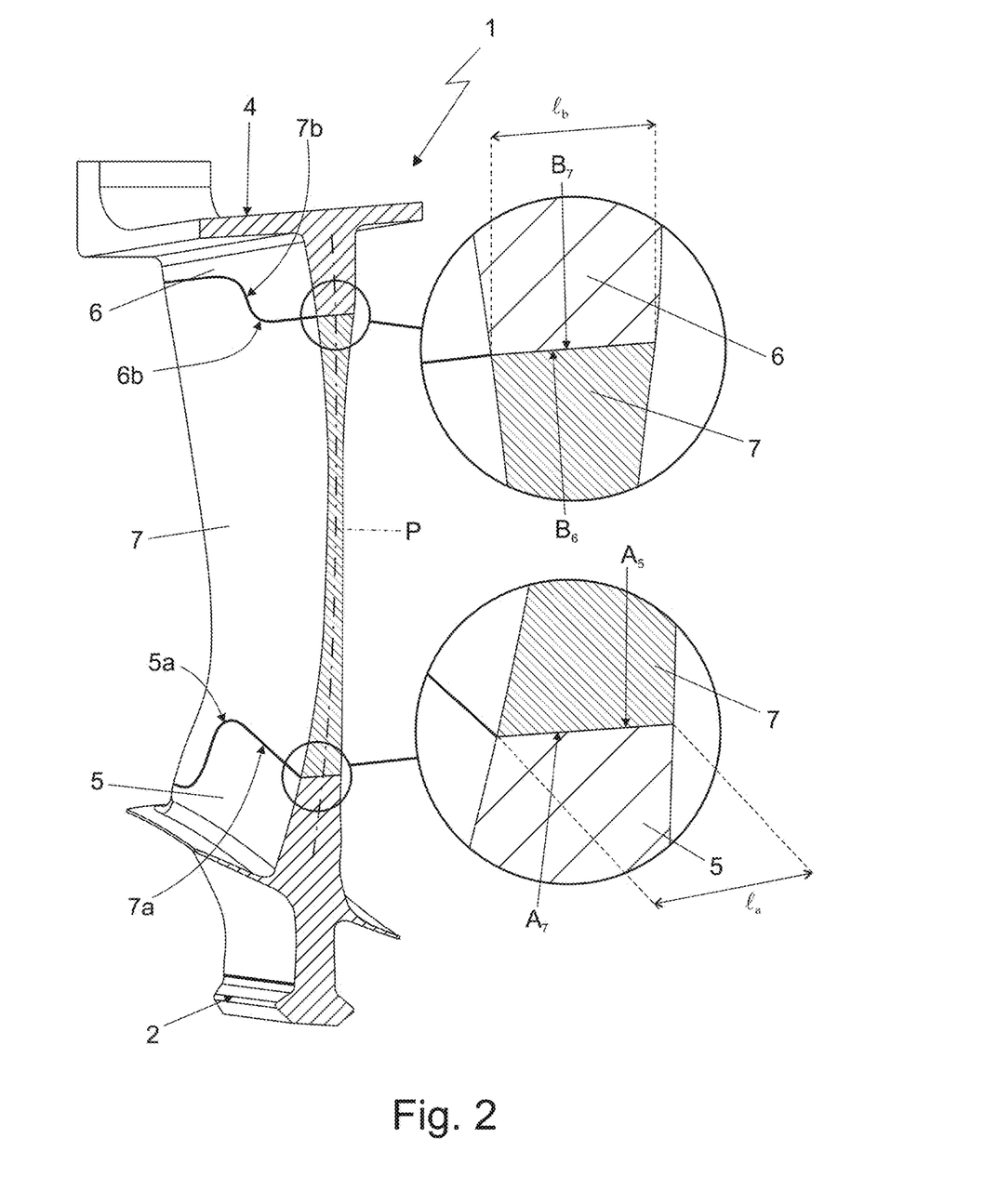
FIG. 2 shows a sectioned perspective view of the FIG. 1 blade.

With reference to FIGS. 1 and 2, number 1 indicates as a whole a turbomachine blade, which may be advantageously used, for example, in the compressor or front fan of a turbine engine preferably, though not necessarily, of the type used in aircraft.

Blade 1 is made of metal, and substantially comprises: a lower coupling root 2 designed to fit and lock rigidly to the turbine engine hub or center blade mounting disk (not shown); an airfoil-shaped oblong member 3 which cantilevers from coupling root 2, so as to cantilever substantially radially outwards of the hub or blade mounting disk (not shown) when coupling root 2 is fixed inside the hub or center blade mounting disk; and an upper coupling head 4, which is located at the second end of airfoil-shaped oblong member 3, i.e. at the opposite end to coupling root 2, and is designed to fit and lock rigidly to the turbine engine outer blade mounting ring (not shown).

In the example shown, coupling root 2, airfoil-shaped oblong member 3, and coupling head 4 are preferably, though not necessarily, made of titanium alloy, aluminum alloy, or special high-strength steel.

In addition, airfoil-shaped oblong member 3 is divided into a lower connecting fin 5, which cantilevers from coupling root 2 towards coupling head 4 and is formed in one piece with coupling root 2; an upper connecting fin 6, which cantilevers from coupling head 4 towards coupling root 2 and is formed in one piece with coupling head 4; and a center plate-like body 7, which is shaped and positioned between the two connecting fins 5 and 6 to form an extension of the fins, and is butt-welded to connecting fins 5 and 6 to form one piece with connecting fins 5 and 6.

More specifically, the lower edge 7a of center plate-like body 7 and the ridge 5a of lower connecting fin 5 are shaped to mate along substantially strip-shaped first conjugate mating surfaces $A_5$, $A_7$ complementary to each other, and which extend seamlessly from the leading edge 3a to the trailing edge 3b of airfoil-shaped oblong member 3 along a curved profile/path in the laying plane/centerline plane P of airfoil-shaped oblong member 3. At least along a center portion of a length preferably equal to over 60% of the total length of conjugate mating surfaces $A_5$, $A_7$, conjugate mating surfaces $A_5$, $A_7$ are preferably of substantially constant width $l_a$ substantially equal locally to the maximum thickness of center plate-like body 7.

In other words, the lower edge 7a of center plate-like body 7 is defined by strip-shaped mating surface $A_7$, the ridge 5a of lower connecting fin 5 is defined by strip-shaped mating surface $A_5$ perfectly complementary to strip-shaped mating surface $A_7$, and the two strip-shaped mating surfaces $A_5$ and $A_7$ mate one to the other.

More specifically, the width $l_a$ of strip-shaped mating surfaces $A_5$ and $A_7$ is substantially equal to the maximum thickness of center plate-like body 7 along a center portion of a length equal to over 80% of the total length of strip-shaped mating surfaces $A_5$ and $A_7$.

More specifically, in the example shown, the width $l_a$ of strip-shaped mating surfaces $A_5$ and $A_7$ is preferably substantially equal to the maximum thickness of center plate-like body 7 up to a distance of less than 10 mm (millimeters) from leading edge 3a and trailing edge 3b of airfoil-shaped oblong member 3 respectively.

Moreover, strip-shaped mating surfaces $A_5$ and $A_7$ preferably, though not necessarily, extend from leading edge 3a to trailing edge 3b of airfoil-shaped oblong member 3 along a curved, substantially Ω (omega) shaped profile/path.

Likewise, the upper edge 7b of center plate-like body 7 and the ridge 6b of upper connecting fin 6 are shaped to mate along substantially strip-shaped second conjugate mating surfaces $B_6$, $B_7$ complementary to each other, and which extend seamlessly from the leading edge 3a to the trailing edge 3b of airfoil-shaped oblong member 3 along a curved profile/path in the laying plane/centerline plane P of airfoil-shaped oblong member 3. At least along a center portion of a length preferably equal to over 60% of the total length of conjugate mating surfaces $B_6$, $B_7$, second conjugate mating surfaces $B_6$, $B_7$ are preferably of substantially constant width $l_b$ substantially equal to the maximum thickness of center plate-like body 7.

Obviously, the width $l_b$ of strip-shaped mating surfaces $B_6$ and $B_7$ also substantially equals width $l_a$ of strip-shaped mating surfaces $A_5$ and $A_7$.

In other words, the upper edge 7b of center plate-like body 7 is defined by strip-shaped mating surface $B_7$, the ridge 6b of upper connecting fin 6 is defined by strip-shaped mating surface $B_6$ perfectly complementary to strip-shaped mating surface $B_7$, and the two strip-shaped mating surfaces $B_6$ and $B_7$ mate one to the other.

More specifically, the width $l_b$ of strip-shaped mating surfaces $B_6$ and $B_7$ is substantially equal to the maximum thickness of center plate-like body 7 along a center portion of a length equal to over 80% of the total length of strip-shaped mating surfaces $B_6$ and $B_7$.

More specifically, in the example shown, the width $l_b$ of strip-shaped mating surfaces $B_6$ and $B_7$ is preferably substantially equal to the maximum thickness of center plate-like body 7 up to a distance of less than 10 mm (millimeters) from leading edge 3a and trailing edge 3b of airfoil-shaped oblong member 3 respectively.

Moreover, second strip-shaped mating surfaces $B_6$ and $B_7$ preferably, though not necessarily, extend from leading edge 3a to trailing edge 3b of airfoil-shaped oblong member 3 along a curved, substantially Ω (omega) shaped profile/path.

Figure 3:
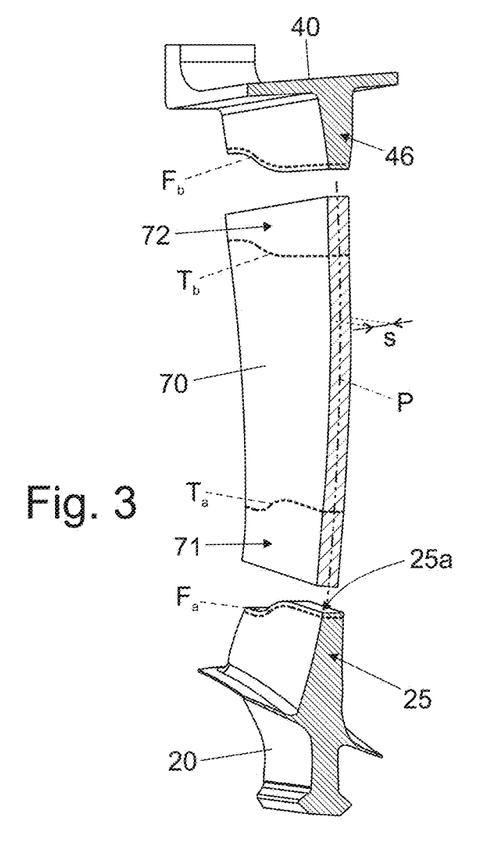
Figure 4:
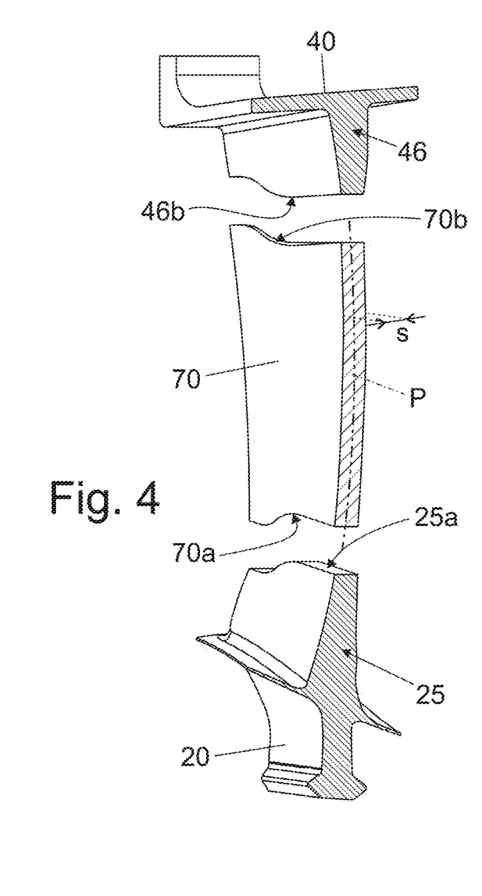

With reference to FIGS. 3 and 4, the method of producing blade 1 comprises:

making, preferably by milling and/or stamping and/or forging and/or die-casting, a first semifinished metal part 20, the three-dimensional shape of which over-approximates the shape of coupling root 2 of blade 1, and which also has a projecting appendage 25, the three-dimensional shape of which over-approximates the shape of lower connecting fin 5;

making, preferably by stamping and/or bending and/or forging and/or die-casting, a metal plate 70 of substantially constant thickness s over-approximating the maximum thickness of center plate-like body 7 of airfoil-shaped oblong member 3 of blade 1, and the three-dimensional shape of which over-approximates the shape of center plate-like body 7 of airfoil-shaped oblong member 3; and making, preferably by milling and/or stamping and/or forging and/or die-casting, a second semifinished metal part 40, the three-dimensional shape of which over-approximates the shape of coupling head 4 of blade 1, and which also has a projecting appendage 46, the three-dimensional shape of which over-approximates the shape of upper connecting fin 6. As used herein, "over-approximates" and "over-approximating" refers to approximating with a larger value or size.

More specifically, the difference between the thickness s of metal plate 70 and the maximum thickness of center plate-like body 7 is less than 2 millimeters, and preferably even less than 1 millimeter.

In the example shown, in particular, the thickness s of metal plate 70 preferably ranges between 5 mm and 40 mm (millimeters).

Again with reference to FIGS. 3 and 4, the method of producing blade 1 also comprises:

removing, preferably by cutting and subsequent milling and/or other material-removing machining operation, the bottom portion 71 of plate 70 located beyond a first transverse reference line $T_a$ having a curved profile in the laying plane/centerline plane P of plate 70; and removing, preferably by cutting and/or milling and/or other material-removing machining operation, the portion of the ridge 25a of projecting appendage 25 of semifinished part 20 located beyond a second transverse reference line $F_a$ which, in the laying plane/centerline plane P of projecting appendage 25, has a curved profile substantially identical to that of first transverse reference line $T_a$.

Preferably, first transverse reference line $T_a$ is the locus of points in which the thickness of plate 70 over-approximates locally the maximum thickness of center plate-like body 7 of airfoil-shaped oblong member 3 of blade 1, preferably by a margin of less than a millimeter. And likewise, second transverse reference line $F_a$ is the locus of points in which the thickness of projecting appendage 25 over-approximates locally the maximum thickness of center plate-like body 7 of airfoil-shaped oblong member 3 of blade 1, preferably by a margin of less than a millimeter.

Preferably, first transverse reference line $T_a$ has a curved, substantially Ω (omega) shaped profile; and second transverse reference line $F_a$ has a curved, substantially Ω (omega) shaped profile substantially identical to that of transverse reference line $T_a$.

Figure 5:
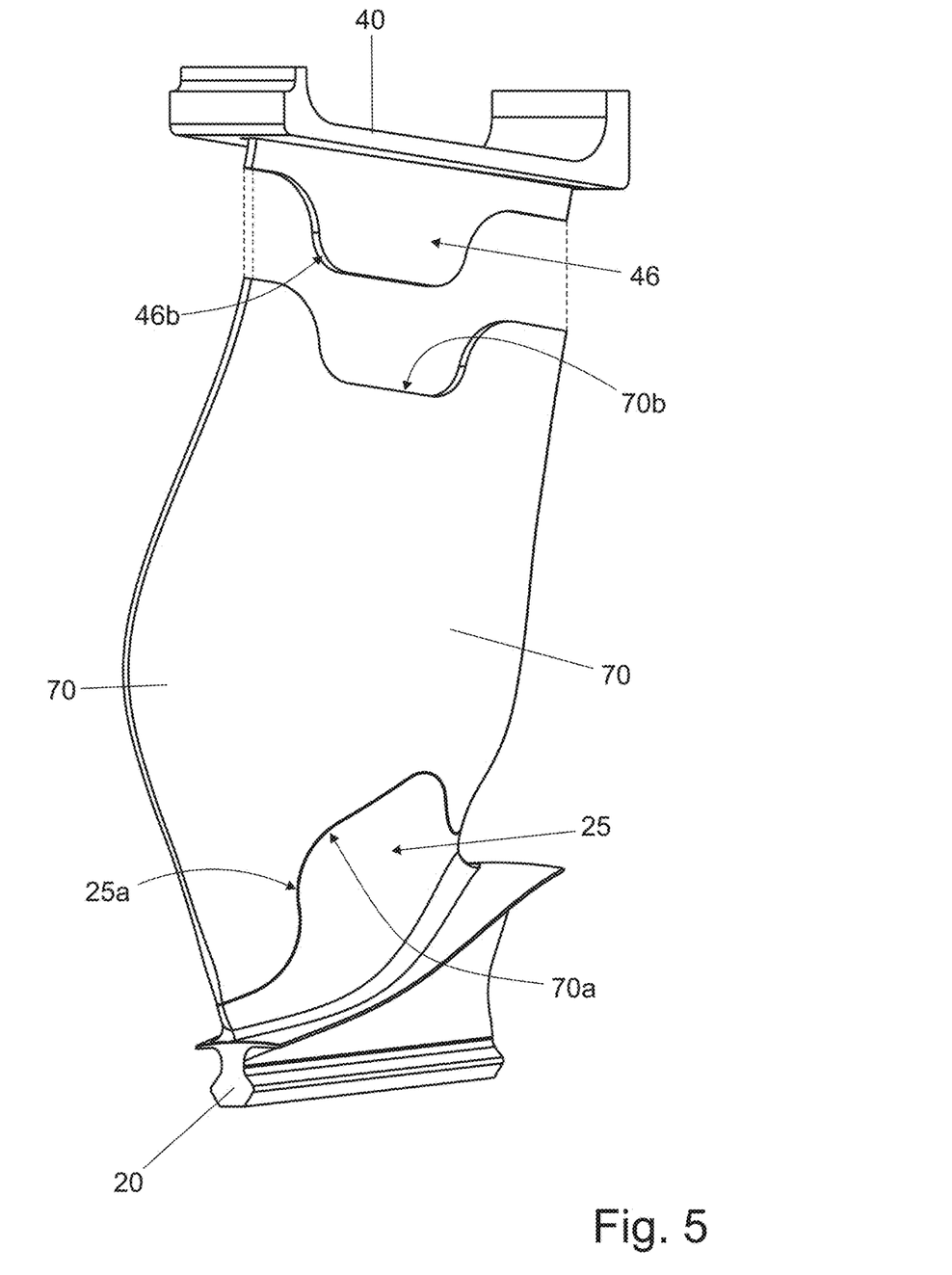
Figure 6:
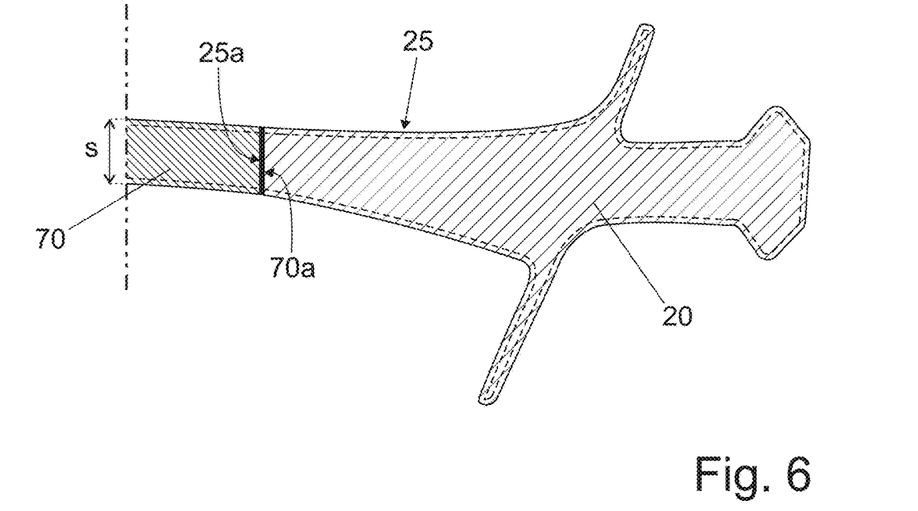

Next, as shown in FIGS. 5 and 6, the method of producing blade 1 comprises:

placing the lower edge 70a, corresponding to first transverse reference line $T_a$, of plate 70 on the ridge 25a, corresponding to second transverse reference line $F_a$, of projecting appendage 25 of semifinished part 20, so that plate 70 is aligned locally with appendage 25 of semifinished part 20; and butt-welding the lower edge 70a of plate 70 to projecting appendage 25 of semifinished part 20 to connect the two parts rigidly to each other.

As shown in FIGS. 3 and 4, the method of producing blade 1 also comprises:

removing, preferably by cutting and subsequent milling and/or other material-removing machining operation, the top portion 72 of plate 70 located beyond a third transverse reference line $T_b$ having a curved profile in the laying plane/centerline plane P of plate 70; and removing, preferably by cutting and/or milling and/or other material-removing machining operation, the portion of ridge 46b of projecting appendage 46 of semifinished part 40 located beyond a fourth transverse reference line $F_b$ which, in the laying plane/centerline plane P of projecting appendage 46, has a curved profile substantially identical to that of third transverse reference line $T_b$.

Preferably, third transverse reference line $T_b$ is the locus of points in which the thickness of plate 70 over-approximates locally the maximum thickness of center plate-like body 7 of airfoil-shaped oblong member 3 of blade 1, preferably by a margin of less than a millimeter. And likewise, fourth transverse reference line $F_b$ is the locus of points in which the thickness of projecting appendage 46 over-approximates locally the maximum thickness of center plate-like body 7 of airfoil-shaped oblong member 3 of blade 1, preferably by a margin of less than a millimeter.

Preferably, third transverse reference line $T_b$ has a curved, substantially Ω (omega) shaped profile; and fourth transverse reference line $F_b$ has a curved, substantially Ω (omega) shaped profile substantially identical to that of transverse reference line $T_b$.

Figure 7:
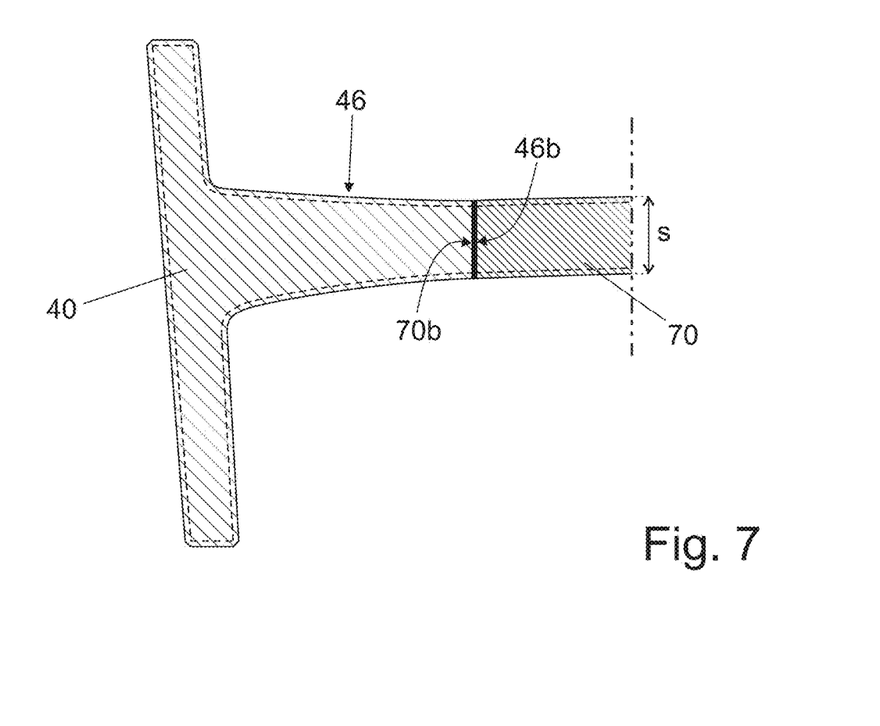

Next, as shown in FIGS. 5 and 7, the method of producing blade 1 comprises:

placing the upper edge 70b, corresponding to third transverse reference line $T_b$, of plate 70 on the ridge 46b, corresponding to fourth transverse reference line $F_b$, of projecting appendage 46 of semifinished part 40, so that plate 70 is aligned locally with projecting appendage 46 of semifinished part 40; and butt-welding the upper edge 70b of plate 70 to projecting appendage 46 of semifinished part 40 to connect the two parts rigidly to each other.

Figure 8:
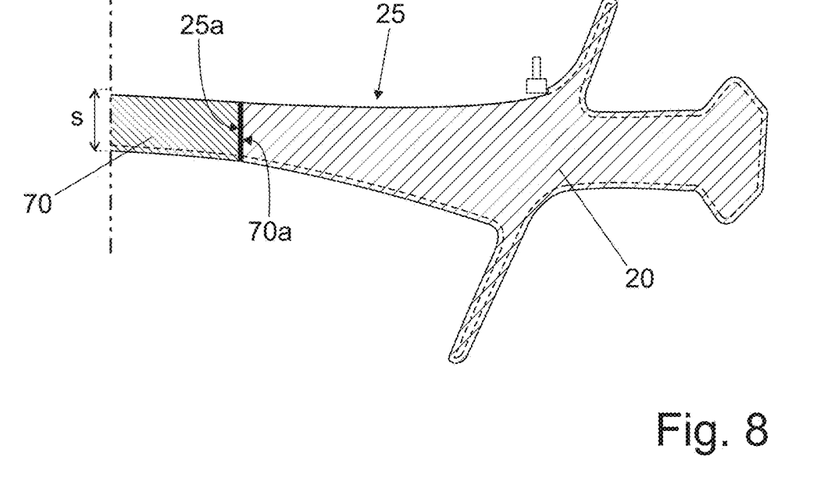
Figure 9:
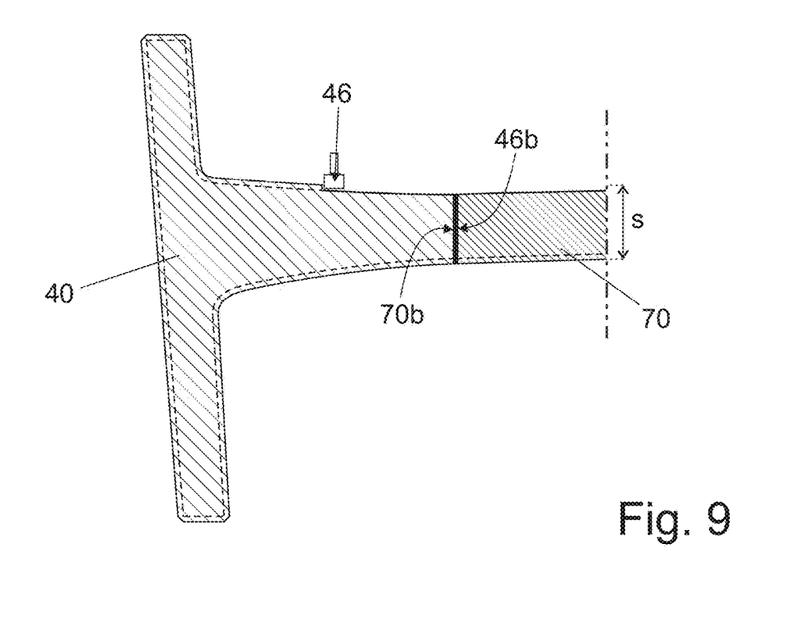

With reference to FIGS. 8 and 9, after welding lower edge 70a of plate 70 to projecting appendage 25 of semifinished part 20, and upper edge 70b of plate 70 to projecting appendage 46 of semifinished part 40, the method of producing blade 1 comprises trimming/machining, by milling or other material-removing machining operation, the excess material from the resulting part to obtain coupling root 2, airfoil-shaped oblong member 3, and coupling head 4 of blade 1 of the desired shape.

More specifically, during the step of removing the excess material from the part formed by butt-welding plate 70 to the two semifinished parts 20 and 40, the method of producing blade 1 comprises:

trimming/machining, by milling or other material-removing machining operation, excess metal off the two major faces of plate 70, including the joins between plate 70 and the two semifinished parts 20 and 40, to obtain airfoil-shaped oblong member 3; and/or trimming/machining, by milling or other material-removing machining operation, excess metal off the long side edges of plate 70, so as to form leading edge 3a and trailing edge 3b of airfoil-shaped oblong member 3; and/or trimming/machining, by milling or other material-removing machining operation, excess metal off the two semifinished parts 20 and 40 to obtain coupling root 2 and coupling head 4 of blade 1.

Once the above material-removing machining operations are completed, plate 70 forms center plate-like body 7 of airfoil-shaped oblong member 3; semifinished part 20 forms both coupling root 2 of blade 1 and lower connecting fin 5 of airfoil-shaped oblong member 3; and semifinished part 40 forms both coupling head 4 of blade 1 and upper connecting fin 6 of airfoil-shaped oblong member 3.

Figure 10:
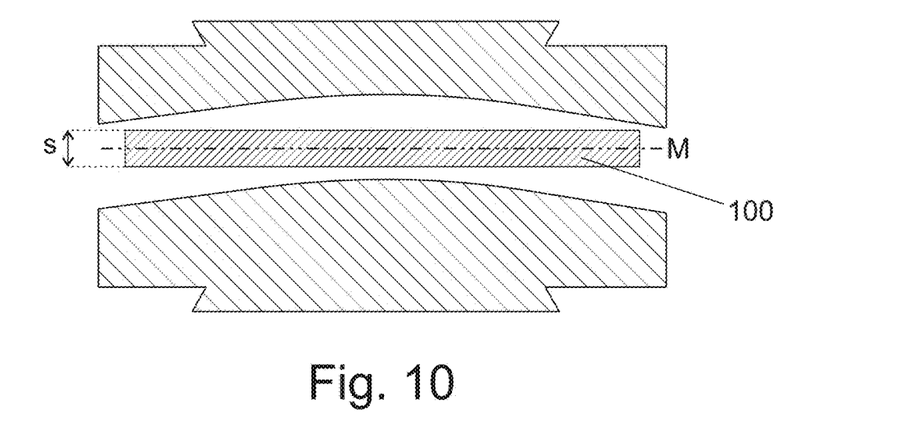
Figure 11:
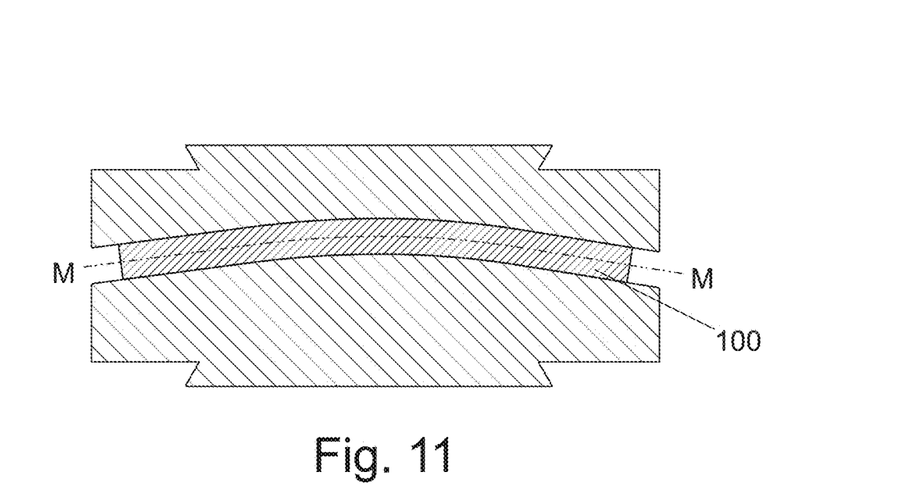
Figure 12:
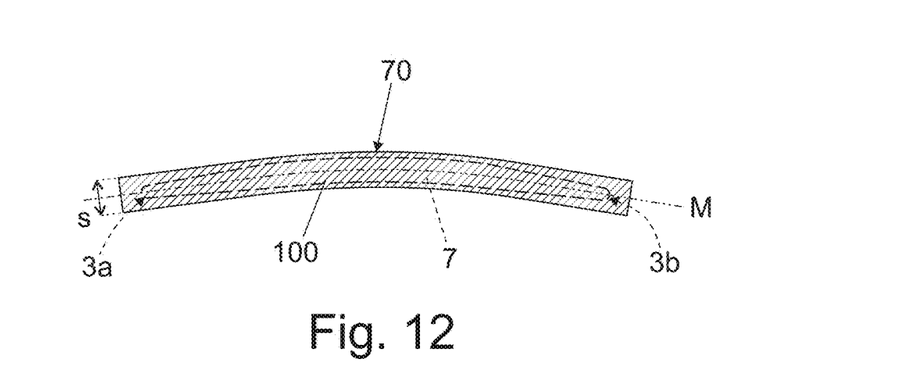

In addition to the above, and with reference to FIGS. 10, 11 and 12, in the example shown metal plate 70 of constant thickness, and of a three-dimensional shape over-approximating the shape of center plate-like body 7 of airfoil-shaped oblong member 3, is preferably formed from a large flat metal plate (not shown) of constant thickness, over-approximating the maximum thickness of center plate-like body 7 of airfoil-shaped oblong member 3 of blade 1, by a process comprising:

cutting, from said large flat metal plate (not shown), a plate piece 100 with a contour over-approximating the flat contour of center plate-like body 7 of airfoil-shaped oblong member 3 of blade 1; and twisting and curving the plate piece 100 via press-forming (i.e. via forming with no noticeable reduction in the nominal thickness of the plate), so that the final three-dimensional shape of the centerline plane M of press-formed plate piece 100 substantially matches the three-dimensional shape of centerline plane P of center plate-like body 7 of airfoil-shaped oblong member 3 of blade 1, to obtain plate 70.

In the example shown, the flat metal plate is preferably 5 mm to 40 mm (millimeters) thick.

The particular structure of blade 1 and the method of producing blade 1 as described above have numerous advantages.

Firstly, the method of producing blade 1 allows the semifinished parts, eventually forming coupling root 2, airfoil-shaped oblong member 3 and coupling head 4 of blade 1, to be produced separately using production processes best suited to the three-dimensional shape and desired mechanical characteristics of each part.

Moreover, joining center plate-like body 7 to upper and lower connecting fins 5 and 6 along conjugate mating surfaces $A_5$, $A_7$, $B_6$ and $B_7$, which extend seamlessly from leading edge 3a to trailing edge 3b of airfoil-shaped oblong member 3 along a curved profile/path in the laying plane/centerline plane P of airfoil-shaped oblong member 3, enormously increases the rigidity and mechanical strength of blade 1, as compared with turbomachine blades with perfectly flat conjugate mating surfaces perpendicular to the laying plane/centerline plane of the airfoil.

Using a metal plate 70 of constant thickness over-approximating the maximum thickness of center plate-like body 7 of airfoil-shaped oblong member 3 of blade 1 furthermore drastically reduces the amount of excess material to be milled or otherwise machined off, and therefore also the time and cost this involves.

Last but not least, by welding the lower edge 70a of plate 70 to projecting appendage 25 of semifinished part 20 (i.e. butt-welding the lower edge 7a of center plate-like body 7 to ridge 5a of lower connecting fin 5) along transverse reference line $T_a$ formed by the locus of points in which the thickness of plate 70 over-approximates locally the maximum thickness of center plate-like body 7 of airfoil-shaped member 3 of blade 1, the amount of excess material to be removed from the weld area between the two parts is minimized, with all the advantages this affords in terms of mechanical strength of the weld between center plate-like body 7 and lower connecting fin 5 of coupling root 2.

Likewise, by welding the upper edge 70b of plate 70 to projecting appendage 46 of semifinished part 40 (i.e. butt-welding the upper edge 7b of center plate-like body 7 to ridge 6a of upper connecting fin 6) along transverse reference line $T_b$ formed by the locus of points in which the thickness of plate 70 over-approximates locally the maximum thickness of center plate-like body 7 of airfoil-shaped member 3 of blade 1, the amount of excess material to be removed from the weld area between the two parts is minimized, with all the advantages this affords in terms of mechanical strength of the weld between center plate-like body 7 and upper connecting fin 6 of coupling head 4.

Clearly, changes may be made to blade 1 and to the method of producing it, without, however, departing from the scope of the present disclosure.

For example, blade 1 may have no coupling head 4, thus simplifying the method of producing blade 1.

In other words, airfoil-shaped oblong member 3 may comprise lower connecting fin 5, which cantilevers from and is formed in one piece with coupling root 2; and center plate-like body 7, which in this case only forms an extension of lower connecting fin 5, and is butt-welded to, to form one piece with, lower connecting fin 5.

In another not shown variation, coupling head 4 of blade 1 may even be formed in one piece with center plate-like body 7.

Figure 13:
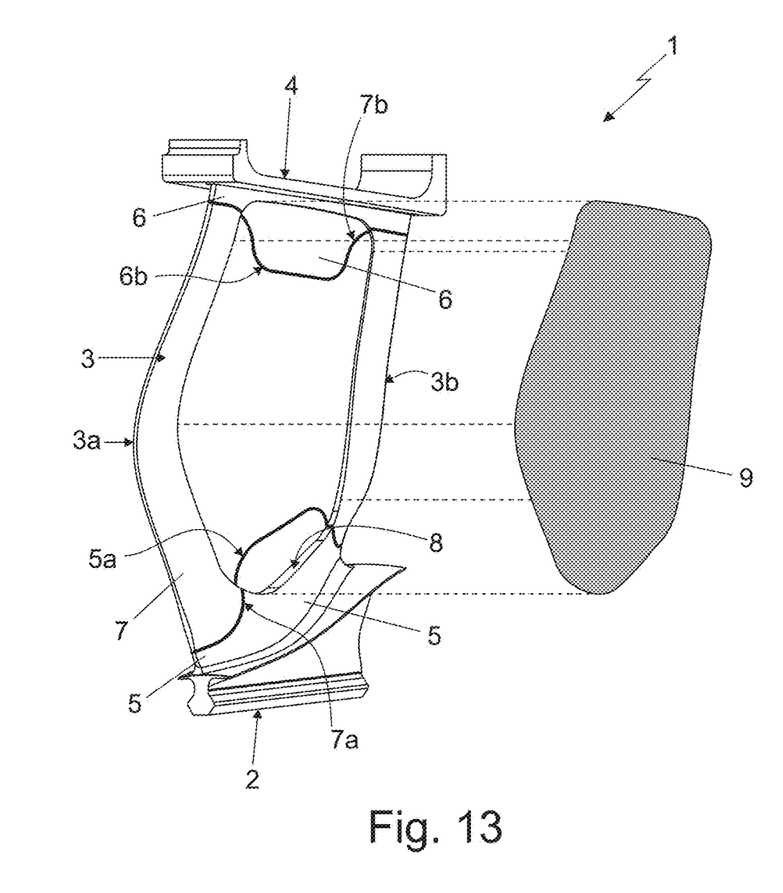
FIG. 13 shows a partly exploded perspective view of a second embodiment of the FIG. 1 turbomachine blade.

With reference to FIG. 13, in a different embodiment of blade 1, airfoil-shaped oblong member 3 may have a closed weight-reducing inner cavity, the three-dimensional shape of which preferably, though not necessarily, substantially matches, to a smaller scale, the three-dimensional shape of airfoil-shaped oblong member 3 as a whole.

More specifically, in the example shown, airfoil-shaped oblong member 3 has, substantially in the center of one of its two major faces, at least one large hollow weight-reducing seat 8 of predetermined shape and preferably extending over 40% of the total area of the major face of airfoil-shaped oblong member 3; and furthermore comprises a cover plate 9, which is complementary in shape to the opening of hollow seat 8, and is fixed irremovably—preferably welded along its entire peripheral edge—to the major face of airfoil-shaped oblong member 3 in which hollow seat 8 is formed, so as to seal the opening of hollow seat 8 and form the sealed weight-reducing cavity of airfoil-shaped oblong member 3.

In which case, after removing the excess material from the part formed by butt-welding plate 70 to the two semifinished parts 20 and 40, the method of producing blade 1 comprises:

forming, on one of the two major faces of airfoil-shaped oblong member 3, by milling or other material-removing machining operation, a large hollow weight-reducing seat 8 of predetermined shape and preferably extending over 40% of the total area of the major face of airfoil-shaped oblong member 3;

cutting and curving a metal plate of suitable thickness, to form a cover plate 9, which is complementary in shape to the opening of hollow seat 8 formed previously on one of the two major faces of airfoil-shaped oblong member 3;

placing cover plate 9 over, so as to seal, the opening of hollow seat 8 and form the sealed weight-reducing cavity of airfoil-shaped oblong member 3; and welding the peripheral edge of cover plate 9 to the peripheral edge of hollow seat 8 to secure cover plate 9 irremovably to the rest of airfoil-shaped oblong member 3.

Preferably, the shape of hollow seat 8 substantially matches, to a smaller scale, the three-dimensional shape of airfoil-shaped oblong member 3 as a whole.

If, in addition to center plate-like body 7 of airfoil-shaped oblong member 3, milling hollow weight-reducing seat 8 also involves one or both connecting fins 5 and 6, it will obviously be the nominal widths $l_a$ and $l_b$ of strip-shaped conjugate mating surfaces $A_5$, $A_7$ and $B_6$, $B_7$ that are substantially constant and over-approximate the maximum thickness of center plate-like body 7, at least along a center portion of a length equal to over 60% of the total length of strip-shaped mating surfaces $A_5$, $A_7$ and $B_6$, $B_7$.

The invention claimed is:

1. A turbomachine blade comprising:
a metal coupling root, and
a metal airfoil-shaped oblong member cantilevered from the coupling root, the airfoil-shaped oblong member including at least a lower connecting fin cantilevered from and formed in one piece with the coupling root, and a main plate-like body which forms an extension of said lower connecting fin and is butt-welded to said lower connecting fin to form one piece with the same fin;
wherein a lower edge of the main plate-like body and a ridge of the lower connecting fin are shaped to mate with each other along strip-shaped first conjugate mating surfaces that are complementary to each other, wherein strip-shaped first conjugate mating surfaces extend from a leading edge to a trailing edge of the airfoil-shaped oblong member along a curved, substantially Ω (omega) shaped path in a laying plane/centerline plane of a longitudinal axis of the airfoil-shaped oblong member.

2. The turbomachine blade as claimed in claim 1, wherein a center portion of given length of said first conjugate mating surfaces is of substantially constant width substantially equal to a maximum thickness of the main plate-like body.

3. The turbomachine blade as claimed in claim 2, wherein said first conjugate mating surfaces has a width that is substantially constant and substantially equal to the maximum thickness of the main plate-like body, at least along a center portion of a length equal to over 60% of a total length of said first conjugate mating surfaces.

4. The turbomachine blade as claimed in claim 1, comprising a metal upper coupling head at an end of the airfoil-shaped oblong member opposite to said coupling root.

5. The turbomachine blade as claimed in claim 4, wherein the airfoil-shaped oblong member also comprises an upper connecting fin cantilevered from the coupling head towards the coupling root and formed in one piece with the coupling head; and the main plate-like body is shaped and positioned between the lower and upper connecting fins to also form an extension of the upper connecting fin, and is also butt-welded to, to form one piece with, the upper connecting fin.

6. The turbomachine blade as claimed in claim 5, wherein an upper edge of the main plate-like body and the ridge of the upper connecting fin are shaped to mate along strip-shaped second conjugate mating surfaces complementary to each other, and which extend from the leading edge to the trailing edge of the airfoil-shaped oblong member along a curved path in the laying plane/centerline plane of the airfoil-shaped oblong member.

7. The turbomachine blade as claimed in claim 6, wherein said second conjugate mating surfaces extend from the leading edge to the trailing edge of the airfoil-shaped oblong member along a curved, substantially Ω (omega) shaped path.

8. The turbomachine blade as claimed in claim 6, wherein a center portion of said second conjugate mating surfaces is of substantially constant width substantially equal to a maximum thickness of the main plate-like body.

9. A turbomachine blade comprising:
a metal coupling root,
a metal airfoil-shaped oblong member cantilevered from the coupling root, the airfoil-shaped oblong member including at least a lower connecting fin cantilevered from and formed in one piece with the coupling root, and a main plate-like body which forms an extension of said lower connecting fin and is butt-welded to said lower connecting fin to form one piece with the same fin; and
a metal upper coupling head at an end of the airfoil-shaped oblong member opposite to said coupling root,
wherein a lower edge of the main plate-like body and a ridge of the lower connecting fin are shaped to mate with each other along strip-shaped first conjugate mating surfaces that are complementary to each other, wherein strip-shaped first conjugate mating surfaces extend from a leading edge to a trailing edge of the airfoil-shaped oblong member along a curved path in a laying plane/centerline plane of a longitudinal axis of the airfoil-shaped oblong member,
wherein the airfoil-shaped oblong member also comprises an upper connecting fin cantilevered from the coupling head towards the coupling root and formed in one piece with the coupling head; and the main plate-like body is shaped and positioned between the lower and upper connecting fins to also form an extension of the upper connecting fin, and is also butt-welded to, to form one piece with, the upper connecting fin, wherein an upper edge of the main plate-like body and the ridge of the upper connecting fin are shaped to mate along strip-shaped second conjugate mating surfaces complementary to each other, and which extend from the leading edge to the trailing edge of the airfoil-shaped oblong member along a curved path in the laying plane/centerline plane of the airfoil-shaped oblong member, and wherein said second conjugate mating surfaces extend from the leading edge to the trailing edge of the airfoil-shaped oblong member along a curved, substantially Ω (omega) shaped path.

* * * * *